Patented July 7, 1925.

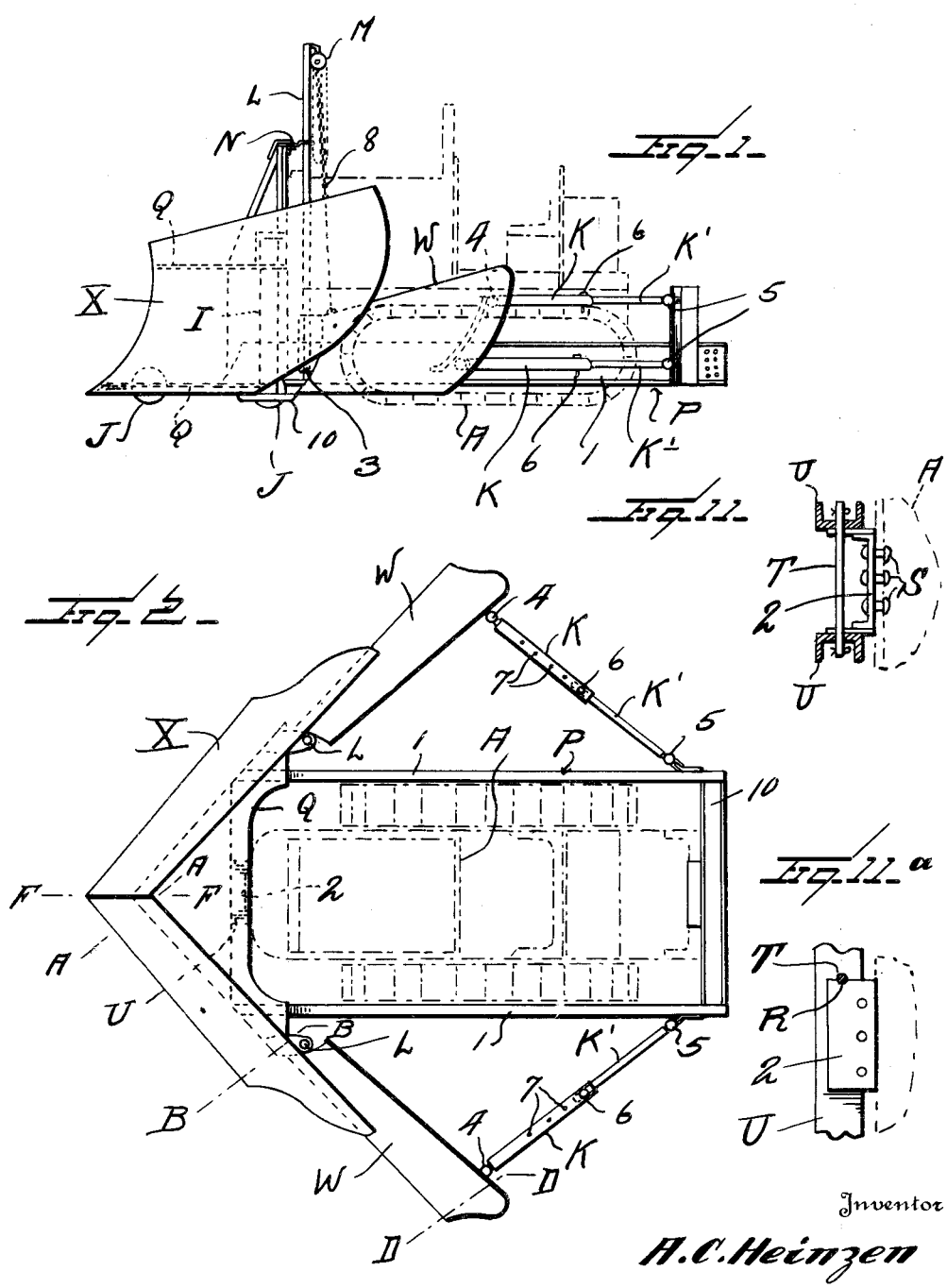

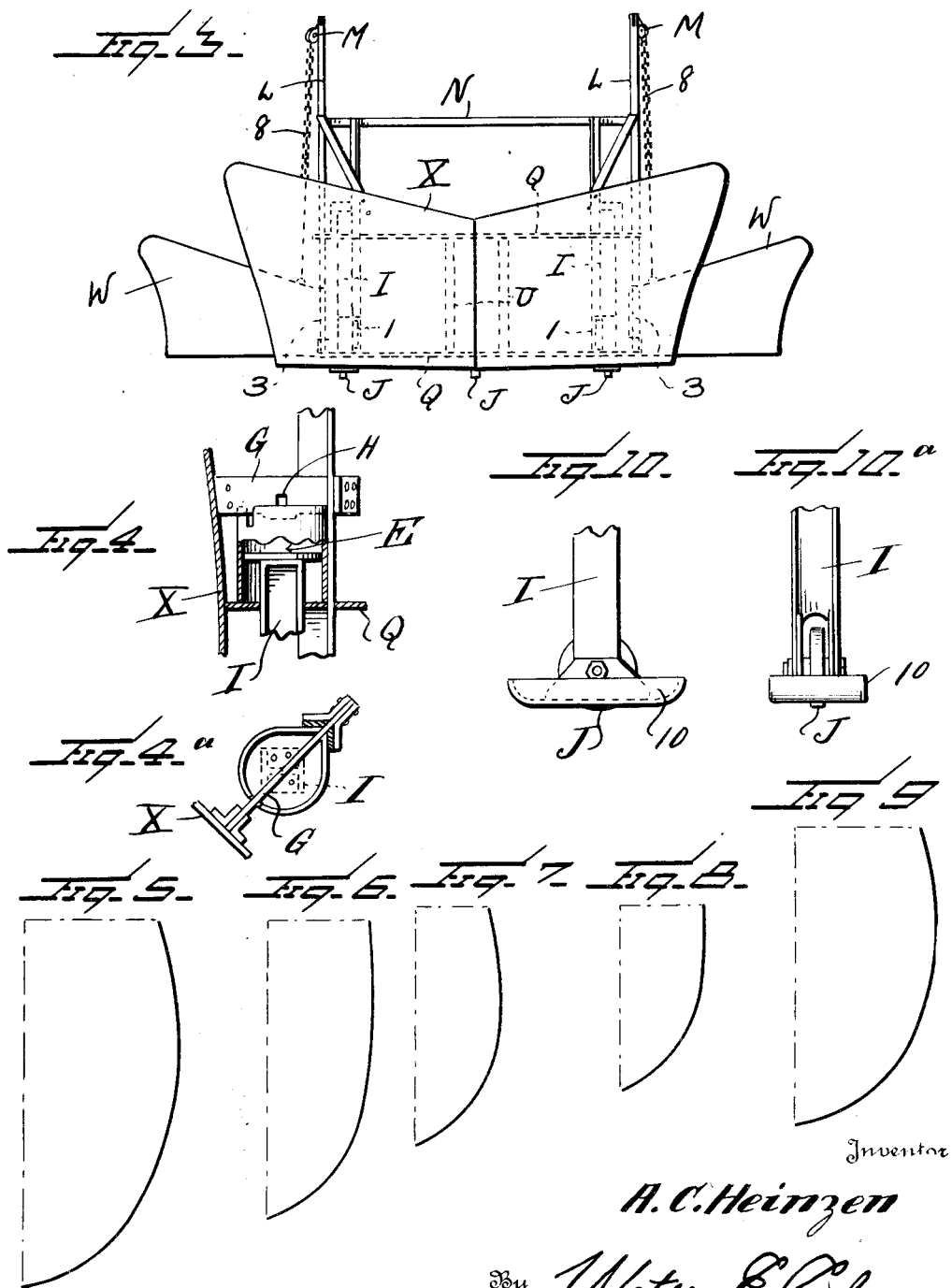

1,544,983

UNITED STATES PATENT OFFICE.

ANTON C. HEINZEN, OF WAUSAU, WISCONSIN.

SNOWPLOW.

Application filed December 11, 1924. Serial No. 755,246.

*To all whom it may concern:*

Be it known that I, ANTON C. HEINZEN, a citizen of the United States, residing at Wausau, in the county of Marathon and State of Wisconsin, have invented certain new and useful Improvements in Snowplows, of which the following is a specification, reference being had to the accompanying drawings.

This invention relates to certain improvements in snow plows and it is an object of the invention to provide a device of this general character embodying a plow having coacting therewith wings which may be readily and conveniently adjusted with respect to the plow as the requirements of practice may necessitate.

Another object of the invention is to provide a novel and improved device of this general character which may be readily hitched or engaged with a tractor, and more especially with a tractor employing a driving device of an endless flexible tract type.

The invention consists in the details of construction and in the combination and arrangement of the several parts of my improved snow plow whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a plow constructed in accordance with an embodiment of my invention and in applied position, the tractor being diagrammatically indicated by broken lines;

Figure 2 is a view in top plan of the structure illustrated in Figure 1 with the tractor also diagrammatically indicated by broken lines;

Figure 3 is a view in front elevation of the device as herein disclosed with certain of the coacting parts indicated by broken lines;

Figure 4 is a fragmentary view in elevation showing in detail the means herein disclosed for raising and lowering the plow;

Figure 4ª is a view in top plan of the structure illustrated in Figure 4;

Figure 5 is a diagrammatic sectional view taken substantially on the line B—B of Figure 2;

Figure 6 is a diagrammatic sectional view on the line A—A of Figure 2;

Figure 7 is a diagrammatic sectional view on the line D—D of Figure 2;

Figure 8 is a diagrammatic sectional view on the line C—C of Figure 2;

Figure 9 is a diagrammatic sectional view on the line F—F of Figure 2;

Figure 10 is a fragmentary view in side elevation of a supporting member for the plow;

Figure 10ª is a fragmentary end elevational view of the structure illustrated in Figure 10;

Figure 11 is a detailed view in top plan of the plow guide and carrier as herein disclosed;

Figure 11ª is a view in rear elevation of the structure as illustrated in Figure 11.

As disclosed in the accompanying drawings, A denotes a tractor diagrammatically indicated by broken lines and preferably of a type wherein the driving structure therefor embodies an endless flexible type.

My improved plow structure comprises a frame P including the side members 1 which extend along the opposite side of the tractor A and which have their rear extremities connected by the removable beam O. The forward end portions of the side members 1 are suitably fixed to a bulk head or plate Q. This bulk head is also adapted for attachment to the front end of the tractor A. The face part of the bulk head has a return inward at this point and the frame is riveted to the side of the bulk head and the channel box 2 for the up and down movement is connected to the same place by the rivets S. This channel box 2 works up and down between the channel beams U fastened to the bulk head whereby such connections serve as a guide and carrier for the plow X when not removing snow. A bolt T goes through the box 2 and the channel beams U but when it is desired to hold the plow in carrying position on the tractor, the bolt T rests in a recess or notch R in the upper end of each side of the box 2.

The plow X is of requisite dimensions and configuration extending beyond opposite sides of the frame P, said plow being of a cross sectional configuration as indicated in diagrammatic Figures 5, 6 and 9.

The transversely spaced posts I each extend upwardly through a box attached to the forward end portion of the frame P, and also as particularly illustrated in Figure 4, through the top of the bulk head so that a jack may be placed between the top of the post and an inwardly directed bar G carried by the plow X so that the post can be raised or lowered to hold the plow to a certain position above the roadway. The bar G is provided with a slot H for the hook of the jack, E denoting the space between the top of the post I and a bar G for the lever jack. Each of the posts I has mounted at its bottom a wheel J and also fixed to the lower end portion of the post I is a shoe or recess 10 to keep the plow X a certain distance above the roadway. The forward or apex portion of the plow X also has operatively engaged therewith a wheel J as is indicated in Figure 1 of the accompanying drawings.

Supported by and extending above the bulk head 2 are the uprights L preferably tubular in form and which have their upper portions connected by the brace member N. Freely engaged with each of the uprights L is a barrel or sleeve 3 carried by the upper forward end portion of a wing W, said wing being in cross section, the cross sectional configuration of the wing being shown in Figures 7 and 8. By this means, each of the wings W is capable of separate swinging movement in a horizontal direction and also of separate vertical adjustment.

The outer or rear end portion of each of the wings W is provided with an inwardly directed eye member 4 with which is operatively engaged an end portion of a tubular rod section K. Telescopically engaged with the rod section K is a second rod section K', the outer end of which being connected through the medium of a universal joint 5 with the rear portion of a side member 1 of the frame P. By retracting or extending the sections K and K' one with respect to the other, the wing W may be swung outwardly or inwardly to desired position with respect to the adjacent side of the plow X and such adjustment may be maintained by disposing a pin 6 selectively through the openings 7 in the section K and through the inserted end portion of the section K'.

Secured to the inner end portion of each of the wings W adjacent the upper margin thereof is a chain or kindred flexible member 8 which is disposed over a block M engaged with the upper portion of an upright L whereby the wing W may be raised and lowered as desired.

The plow structure herein disclosed is of a character to be readily applied to the tractor A and in a manner to render the same highly efficient in connection with clearing a roadway of snow and which structure also permits the plow X and the wings W to be raised to and maintained in an inoperative position so that the tractor can be readily transported from one locality to the other. Furthermore, the structure is such to readily permit the same to be readily removed from the tractor and stand by itself without the use of blocking until it is again assembled with respect to the tractor. Removing of the rear cross member or beam O readily permits the disassembling of the plow structure with respect to the tractor and also permits its ready operative engagement with the tractor.

From the foregoing description it is thought to be obvious that a snow plow constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a propelling vehicle, a frame disposed therearound and supported thereby, a plow, a bulk head carried by the plow to which the forward portion of the frame is attached, and means for attaching the bulk head to the adjacent portion of the propelling vehicle.

2. In combination with a propelling vehicle, a frame disposed therearound and supported thereby, a plow, a bulk head carried by the plow to which the forward portion of the frame is attached, means for attaching the bulk head to the adjacent portion of the propelling vehicle, uprights supported by and extending above the bulk head, wings freely engaged with said uprights, and means for raising and lowering the wings along the uprights.

3. In combination with a propelling vehicle, a frame disposed therearound and supported thereby, a plow, a bulk head carried by the plow to which the forward portion of the frame is attached, means for attaching the bulk head to the adjacent portion of the propelling vehicle, uprights supported by and extending above the bulk head, wings freely engaged with said uprights, means for raising and lowering the wings along the uprights, and means coacting with the wings and the frame for adjusting the wings toward or from the frame.

4. In combination with a propelling vehicle, a frame disposed therearound, a plow positioned forwardly of the vehicle, a bulk head carried by the plow, vertically disposed beams carried by the bulk head, a box fitting between said beams, means for attaching the box to the vehicle, and a member engageable with the beams and adapted to rest upon the box to maintain the plow in a raised position.

5. In combination with a propelling vehicle, a frame disposed therearound, a plow positioned in advance of the vehicle, means for connecting the plow to the vehicle, a bulk head carried by the plow, vertically disposed posts freely directed through the bulk head, wheels carried by the lower end portions of the uprights, and an inwardly directed arm carried by each of the uprights and overlying the bulk head and spaced therefrom to permit a lifting jack to be interposed between said arm and bulk head.

In testimony whereof I hereunto affix my signature.

ANTON C. HEINZEN.